June 17, 1958 R. W. HUTTON ET AL 2,839,611

PBX LINE-HUNTING SYSTEM

Filed March 24, 1955 3 Sheets-Sheet 1

June 17, 1958 R. W. HUTTON ET AL 2,839,611
PBX LINE-HUNTING SYSTEM
Filed March 24, 1955 3 Sheets-Sheet 2
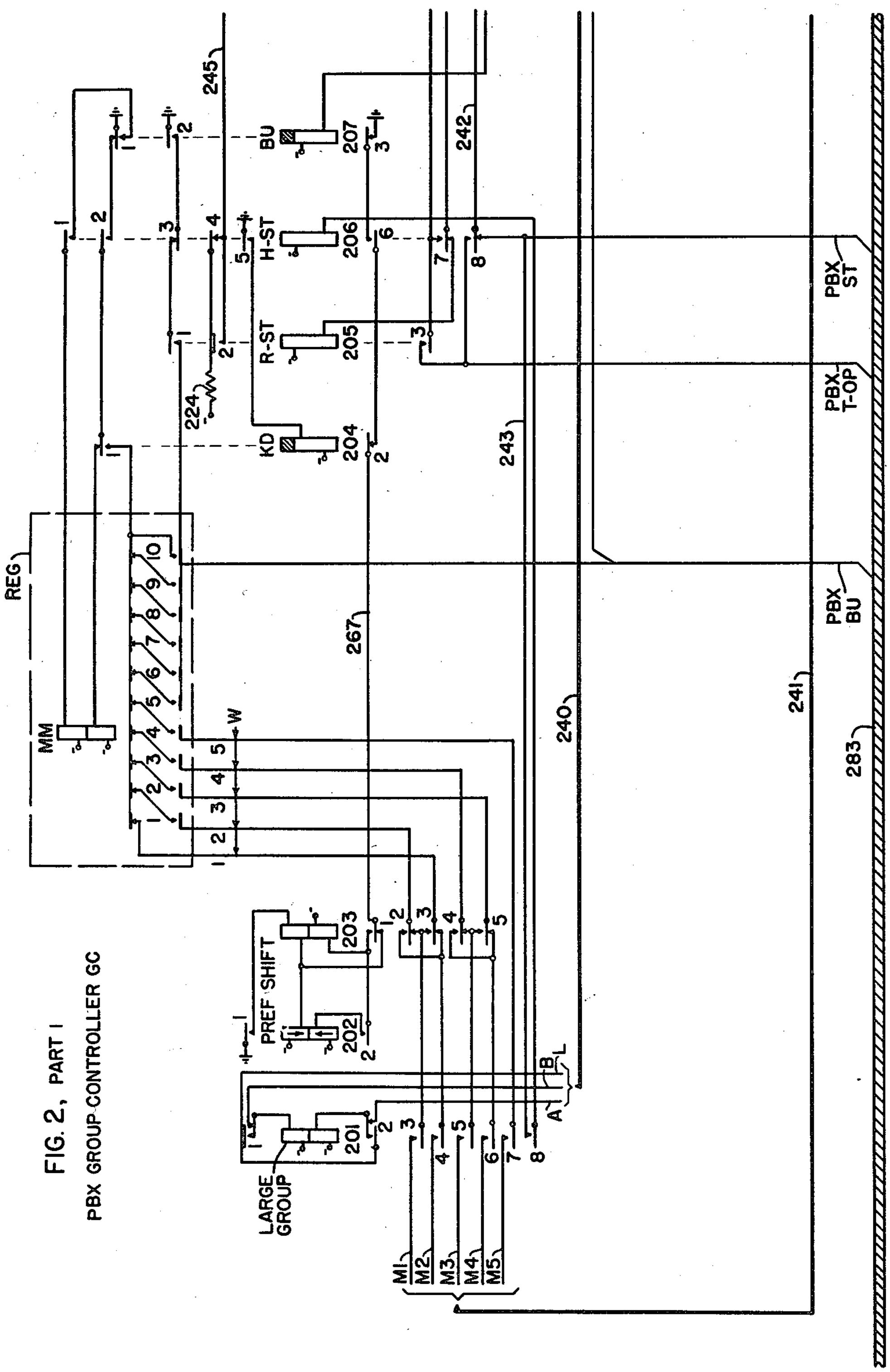
FIG. 2, PART I
PBX GROUP-CONTROLLER GC June 17, 1958 R. W. HUTTON ET AL 2,839,611
PBX LINE-HUNTING SYSTEM
Filed March 24, 1955 3 Sheets-Sheet 3
FIG. 2, PART 2
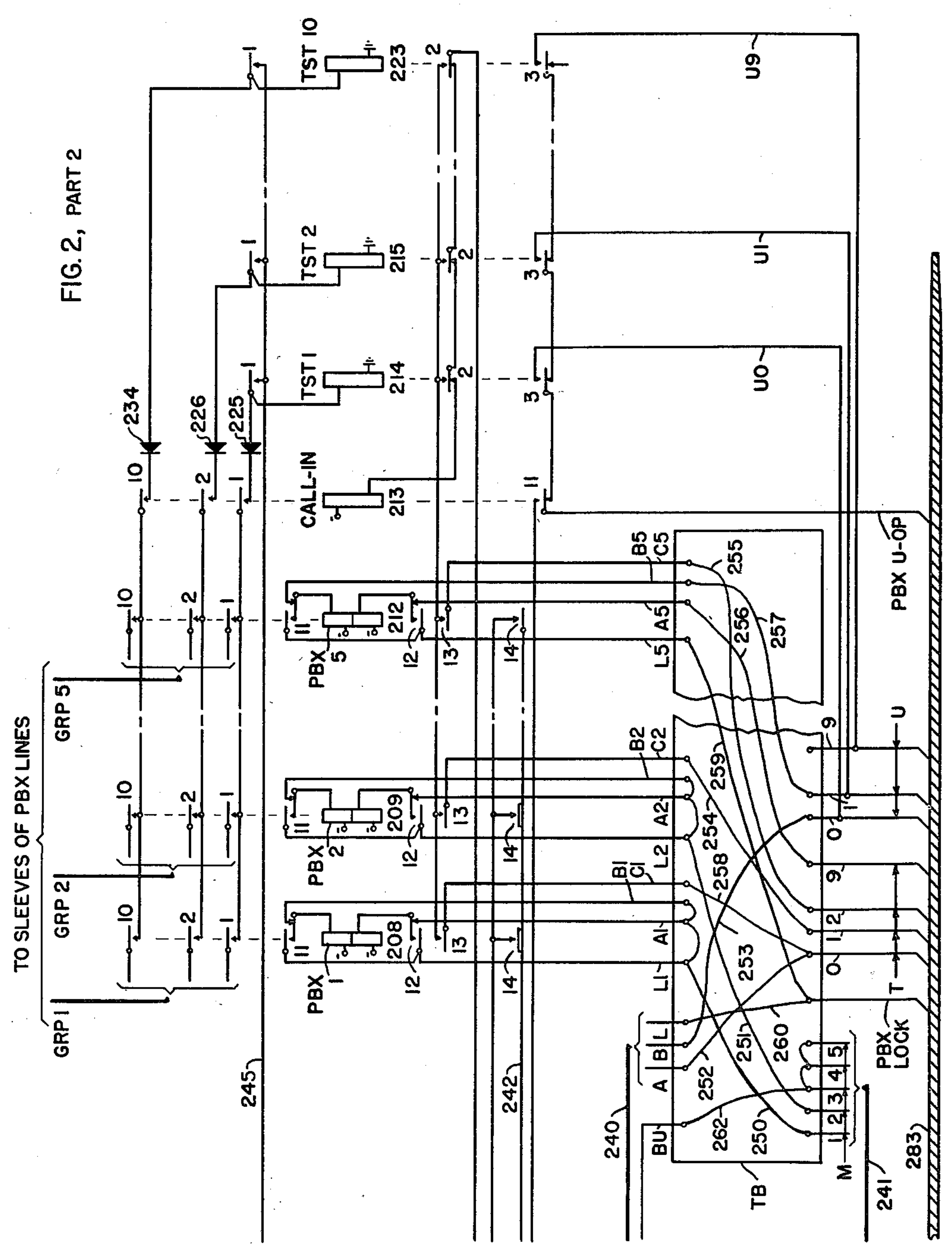

United States Patent Office 2,839,611

Patented June 17, 1958

2,839,611

PBX LINE-HUNTING SYSTEM

Robert W. Hutton and Edward J. Leonard, Chicago, Ill., assignors to International Telephone and Telegraph Corporation, New York, N. Y., a corporation of Maryland Application March 24, 1955, Serial No. 496,468

7 Claims. (Cl. 179—18)

This invention relates in general to P. B. X line-hunting systems and in particular to P. B. X systems of the type wherein a common group of test relays is provided for testing and selecting an idle one of the lines in a called P. B. X group as distinct from P. B. X systems employing a separate test relay for each P. B. X line. Its principal object is to provide a new and improved control arrangement for simply and economically handling calls to P. B. X lines of the above-described character.

*General description*

In telephone systems, it is common practice for a subscriber to have a group of lines extending to his premises and terminating at the switchboard of a private branch exchange (P. B. X) thereon. Such groups of lines are commonly termed P. B. X line groups or trunk groups and have a common directory number assigned thereto, the dialing of such number causing a connection to be extended to an idle one of the lines of the P. B. X group. Since the number of lines in a P. B. X group varies according to the requirements of the subscribers, a group of P. B. X lines may include only several lines or may include fifty or more lines, these variations in P. B. X group sizes usually complicating the testing and selecting operations required for completing connections to P. B. X lines.

According to the present invention, the above noted selecting and testing of lines in a called P. B. X group is facilitated by a simple, and reliable arrangement which permits the testing of a maximum of ten lines at one time with provisions for handling the large P. B. X groups by successively calling-in subgroups of P. B. X lines for test until an idle one is found or until all lines are tested.

Heretofore, in P. B. X systems wherein P. B. X groups included lines from several different line groups or physical groups, and wherein the usual number of ten lines are tested at one time by a group of common test relays, each test relay of the group required at least two sets of contacts for marking the tens and units location of the associated idle line. Additionally, each call-in relay or group relay for connecting the lines to associated test relays required twenty contact sets for the two contact sets of each of the ten test relays and included at least ten contact sets for connecting the test conductors of the associated lines to the test relays.

According to the present invention, arrangements are provided so that a separate call-in or group relay is assigned to the lines of each different line group and the test relays are assigned to corresponding ones of the lines in that group, such arrangements utilizing the call-in relay for the tens marking and utilizing the test relay for the units marking, resulting in a substantial reduction in the contact elements required for P. B. X connections.

The above-mentioned and other features and objects of this invention and the manner of attaining them will become more apparent and the invention itself will be best understood, by reference to the following description of an embodiment of the invention taken in conjunction with the accompanying drawings comprising Figs. 1 and 2, wherein:

Fig. 1 discloses, in partial circuit detail, the final or connector stage of a typical telephone switching system; and Fig. 2, parts 1 and 2, discloses in circuit diagram, a controller for controlling the switching stage of Fig. 1 to direct calls to idle lines of called P. B. X groups.

*Detailed description*

Figure 1:
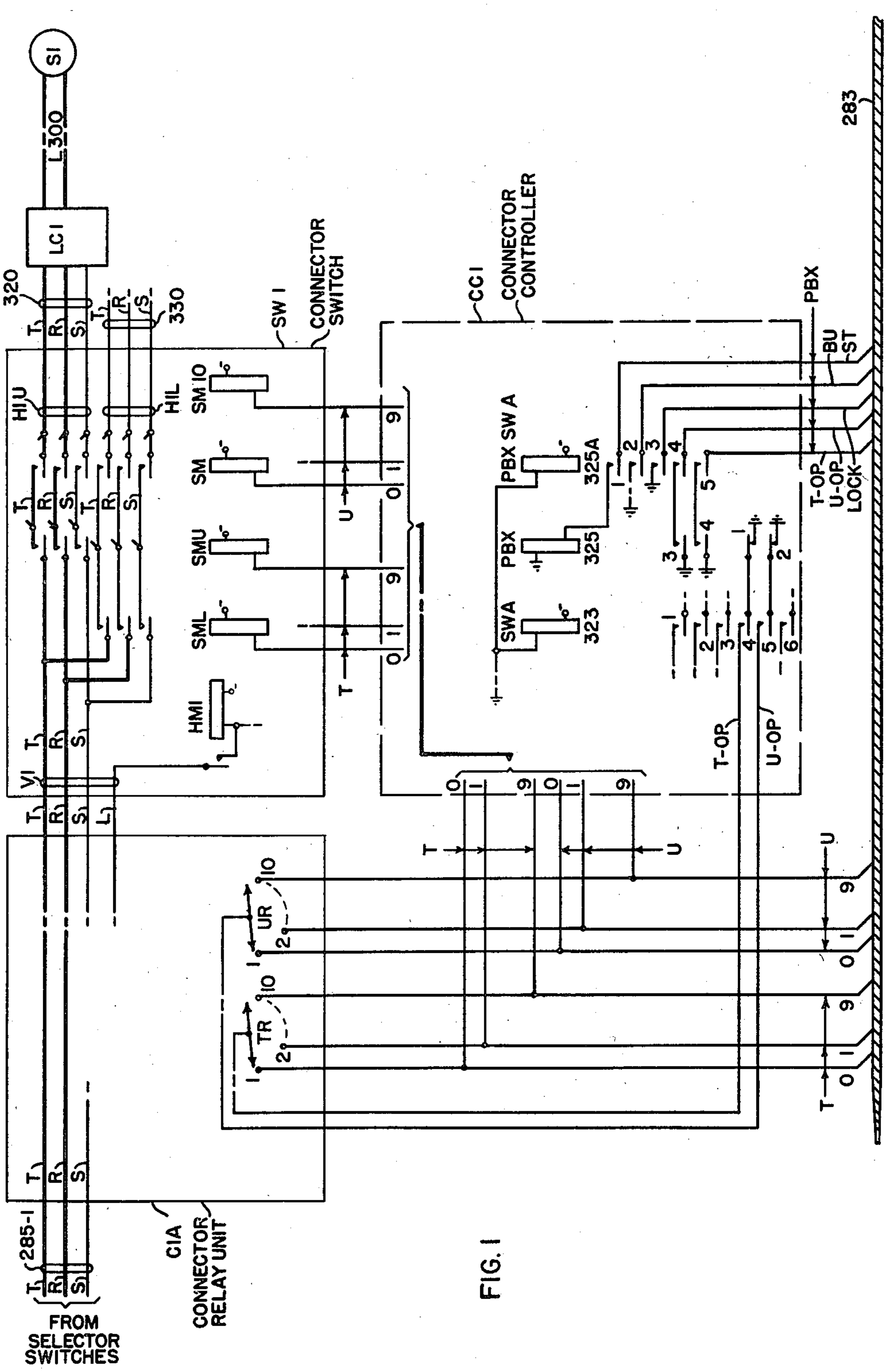

It has been chosen to disclose this invention as embodied in a telephone system such as disclosed in the United States patent application of R. W. Hutton et al., for a Crossbar-Switch Connector System, Serial No. 490,892, now Pat. 2,773,128 granted May 10, 1956, filed February 28, 1955. In such application, the operation of the connector switching stage or final switching stage in extending a connection to a particular called line in accordance with the assigned directory number was described. This present invention discloses an arrangement for controlling the connector switching stage of the above noted application to cause a connection to be extended to any idle line of a P. B. X group of lines when a special P. B. X directory number is dialed.

Referring now to Fig. 1 of the drawings, a final or connector stage is shown comprising connector relay units, such as connector C1A, a connector controller CC1, and a connector switch SW1, such equipment being assumed to be similar to the corresponding items of apparatus of the noted Hutton et al. application.

In a manner similar to that described in the Hutton et al. application, a call received over the incoming trunk 285—1 from the preceding selector stage (not shown) causes operations to occur which seize an idle connector relay unit, such as unit C1A, and permits tens and units digits of a directory number of a desired line to be thereafter dialed and registered therein. Shortly thereafter, connector controller CC1 becomes individualized with the calling connector, and a relay therein (relay 317 of the noted Hutton et al.) operates regular switch relay 323 and P. B. X switch relay 325A.

At such time, break contacts 1 and 2 of P. B. X relay 325 extend ground through make contacts 4 and 5 of relay 323 to the tens and units operate wires T–OP and U–OP. These grounds, appearing on the tens and units operate wires are extended through the brushes of the tens register TR and the units register UR to energize the corresponding ones of the digit wires T0 to T9 and U0 to U9, according to the value of the recorded tens and units digits. The ground on the tens digit wire is extended to the battery-connected winding of the corresponding one of the extension magnets SML or SMU of the associated connector switch thereby selecting the switch and ten-line group therein containing the line that corresponds to the recorded digits, and the ground on the units digit wires is extended to the corresponding one of the principal select magnets, SM1 to SM10, to select the individual line in the selected line group. At the same time, the ground on the tens and units wires is transmitted over corresponding conductors in cable group 283 to terminal board TB of the P. B. X group controller GC.

In the event that the call is to a specific line and not to an idle line in a P. B. X group, operations occur to extend the connection to the called line by causing the hold magnet associated with the vertical terminating the calling conductor to operate, whereby the trunk conductors of trunk 285—1 are connected to a station S1 on a called line L300 by way of a switch SW1.

In the event the transmitted digit information is indicative of a line in a P. B. X group, operations occur in the P. B. X group controller GC to operate the P. B. X relay of controller CC1 to cancel the settings of the select magnets, if already operated, and to place the select magnets under control of the P. B. X group controller. In this way, the P. B. X group controller, together with connector controller CC1, selectively controls the digit wires to extend a connection from a calling trunk 285—1 to an idle line in a called P. B. X group.

Responsive to the completion of a connection to an idle line in a P. B. X group, connector controller CC1 and P. B. X group controller GC are returned to normal use and the connection is held by connector relay unit C1A and the operated hold magnet of the associated switch, in the manner described in the noted Hutton et al application.

Referring now to Fig. 2, Parts 1 and 2 of the drawings, a detailed description of the operation of the P. B. X group controller in overriding the normal dialed digit information, in favor of translated information indicative of an idle line in a called P. B. X group, will be given.

The 23 relays of P. B. X group controller GC have principal functions assigned thereto as follows:

Relay 201 (Large-Group Relay) operates when digits indicative of a P. B. X group containing more than ten lines are dialed, to call-in for test portions of the lines of that P. B. X group;

Relays 202 and 203 (Preference Shift Relays) operate on successive calls to shift the preference of the groups of lines called-in for test in order to balance the traffic to lines in the large P. B. X groups;

Relay 204 (Knockdown Relay) operates on the start of each P. B. X call to a large P. B. X group to shift the call-in preference among the P. B. X subgroups;

Relay 205 (Regular-Start Relay) operates if a P. B. X group containing ten lines or less in the same ten-line group is called, to start the P. B. X controller into directing a call to an idle line in such group;

Relay 206 (Hunt-Start Relay) operates if a P. B. X group containing more than ten lines or lines in two or more ten-line groups is called, to start the group controller into testing the P. B. X lines, one subgroup of such lines at a time;

Relay 207 (Busy Relay) operates on P. B. X calls to transmit a busy indication to the connector responsive to all the lines called-in being busy, and/or operates on calls to large P. B. X groups responsive to all P. B. X lines in a called-in subgroup being busy, to shift the call-in to the next subgroup of lines;

Relays 208 to 212 (P. B. X Group Relays) are assignable for operation when preassigned tens and units digits are dialed and when operated, call-in groups of P. B. X lines for test;

Relay 213 (Call-in Relay) operates to connect the sleeves of the lines of the called-in group to the test relays; and Relays 214 to 223 (Test Relays) correspond respectively to the ten lines in a called-in group of lines and operate responsive to the associated line being idle.

A digit register REG is provided for shifting the preference among the subgroups of the large P. B. X groups. This register may be assumed to be an impulse counter, stepping switch, or any device which responds to pulses to shift its contact sets in accordance with such impulses.

Jumper board JB is provided to interconnect the digit wires to the P. B. X group relays as desired, and to interconnect control wires of the large group call-in relay to control wires of the group relays serving P. B. X subgroups of lines.

The sleeves of lines assigned for P. B. X service are connected to contacts on the group relays 208 to 212 by jumpers (not shown), such connections corresponding to the ten-line groups containing such lines and to their units location therein. For example, if line A is the third line in the ten-line group 1, the sleeve conductor thereof is connected to contacts 3 of the group relay assigned to ten-line group 1.

*Ten-line P. B. X group*

For purposes of illustration, assume a P. B. X group containing ten lines or less, all lines being in the group "2" ten-line group, is assigned a common directory number having the tens and units digits 91. In such event, responsive to the dialing of the tens digit 9 and the units digit 1, the lines in the group "2" ten-line group must be called-in for test in order that an idle one therein be selected for connection to the calling line.

It has been chosen to assign P. B. X relay 212 to the P. B. X group reached by dialing the digits 91. Accordingly, the A5 conductor is connected by jumper 256 to the tens wire T9 and the B5 conductor is connected by jumper 257 to the units wire U1. In this manner responsive to the dialing of the digits 91, ground appearing on the digit wires T9 and U1, appears on the A5 and B5 conductors extending to the battery-connected windings of the P. B. X relay 212.

The P. B. X group relays 208 to 212 are so adjusted that flux generated by current flow through either winding is insufficient to operate the concerned relay, but when both windings are energized such relay operates. Accordingly, if the tens digit 9 is dialed and a units digit other than the units digit 1 is dialed, the associated relay, in this case relay 212, fails to operate as only the lower winding was energized.

Assuming the digits 91 to be dialed, P. B. X relay 212 operates and locks operated through its contacts 11 and 12 and jumper 259 to the locking wire P. B. X LOCK, such wire being grounded at make contacts 3 of operated P. B. X switching relay 325A of connector controller CC1. Its make contacts 1 to 10 extend the sleeve conductors of the associated lines to contacts on the call-in relay 213 in preparation for connection to the test relays; its break contacts 11 and 12 disassociate the locking ground from the tens and units wires to prevent any interaction therewith; and its contacts 14 connect the battery-connected winding of the regular-start relay 205 in series with the ground-connected winding of the P. B. X relay 325 of connector controller CC1, through break contacts 7 of relay 206, conductor 242, break contacts 8 of relay 206, P. B. X start conductor P. B. X ST, and makes contacts 1 of relay 325A.

At such time, P. B. X relay 325 and regular start relay 205 operate in series. Break contacts 1 and 2 of P. B. X relay 325 remove ground from the tens operate and units operate wires T–OP and U–OP and consequently from the tens and units wires, restoring any operated select magnets. At such time, make contacts 3 and 4 of P. B. X relay 325 and contacts 4 and 5 of P. B. X switch relay 325A ground the P. B. X tens and units operate wires (P. B. X T–OP and P. B. X U–OP) extending to the P. B. X group controller GC over conductors in cable group 283.

The ground on the P. B. X tens operate wire P. B. X T–OP is extended through make contacts 3 of operated regular start relay 205 and through the chained break contacts 2 of the ten test relays 214 to 223 to the battery-connected winding of call-in relay 213.

Call-in relay 213 operates, and at its make contacts 1 to 10, further extends the sleeve conductors of the lines associated with group relay 212 through associated rectifiers 225 to 234 to the ground-connected windings of the test relays 214 to 223, and its make contacts 11 extend the ground on the units wire P. B. X U—OP to the battery-connected winding of slow-operating busy relay 207.

When any of the lines called-in are idle, battery potential appearing on the sleeve conductor thereof is extended through the closed contacts on relays 212 and 213 and through the associated rectifiers to the ground-connected winding of the associated test relay, causing such relays to operate.

When any of the lines called-in are busy, ground potential appearing on the sleeve conductor thereof shunts the ground-connected winding of the associated test relay, preventing their operation.

Assuming the first line in the called P. B. X group to be idle, battery potential from the sleeve conductor S of the first line in the called P. B. X group is extended through make contacts 1 of relay 212, make contacts 1 of call-in relay 213, and through the associated rectifier 225, to the ground-connected winding of test relay 214, causing it to operate.

At its make contacts 2, test relay 214 open-circuits the operate path of call-in relay 213 permitting it to restore and transfers such operating ground to make contact 13 of the operated P. B. X group relay 212.

Responsive to the operation of a test relay and the consequent restoration of the call-in relay, the testing operation is discontinued and ground is removed from the winding of busy relay 207, slow-operating relay 207 not having had time to operate.

Test relay 214 locks operated through its make contacts 1 to the resistance-battery appearing on conductor 245 from current-limiting resistor 224 and make contacts 2 of relay 205; and its contacts 3 extend the ground on the P. B. X units operate wire P. B. X U–OP through back contacts 11 of now-restored call-in relay 213 and through make contacts 3 of the operated test relay to the units wire corresponding to the line found idle.

As previously pointed out, since the sleeves are jumpered in accordance with their physical location, the first line in the called P. B. X group corresponds to the units digit 0, the second line corresponds to the units digit 1, and so forth, then the line associated with test relay 214 is associated with units digit 0, the line associated with test relay 215 is associated with units digit 1, and so forth. Accordingly, responsive to the operation of relay 214, the units digit wire corresponding to the units digit of the selected line is grounded to operate the principal select magnet corresponding thereto, in this case select magnet SM1 of the associated switch.

At the same time, the ground appearing on make contacts 13 of relay 212 appears on the C5 conductor and is extended by jumper 255 to the tens wire T2, to cause the extension select magnet corresponding to such tens digit to operate. Such an arrangement permits the P. B. X lines located in group 2 ten-line group to be reached by dialing a tens digit indicative of a different ten-line group, such condition just described, as a tens digit 9 was dialed to reach lines associated with a tens digit 2.

With the grounding of the tens digit wire T2 and the units digit wire U0, the select magnets of the associated switch are operated as described in the noted Hutton et al. application to cause the hold magnet associated with the calling connector to operate, and the connection to be extended to the selected idle line in the called P. B. X group and maintained until disconnect by the calling and called lines.

As described, responsive to the cut-through operations of connector C1A, the controller is returned to common use thereby restoring relay 325A. Responsive to the restoration of relay 325A, the series connection of P. B. X relay 325 and the regular start relay 205 of the group controller GC is opened, and returns all operated relays in controller GC to their normal condition by the removal of ground from the lock wire L and the removal of battery from locking wire 245.

In the event no lines were idle in the called P. B. X group, none of the test relays 214 to 223 operate and ground from the P. B. X tens operate wire P. B. X T–OP is maintained on the battery-connected winding of the slow-operating busy relay 207. After a suitable delay interval, busy relay 207 operates and at its make contacts 2 extend ground potential through make contacts 3 of relay 206 and make contacts 1 of regular-start relay 205 to the P. B. X busy wire P. B. X BU, to cause the connector relay unit C1A to return busy tone to the calling subscriber and to clear out the controllers.

*Twenty-line P. B. X group*

As another example, assume that there are 20 lines in a P. B. X group assigned the tens and units digits 00, with the first ten lines being physically located in the group "0" ten-line group and the second ten lines being physically located in the group "1" ten-line group. Since a maximum of ten lines can be tested at any one time, the 20 lines must be called-in for test in two groups of ten lines each, with each group of ten lines being tested separately. In order to test the P. B. X subgroups separately, it has been chosen to assign relay 208 for the ten lines in the first ten-line group and relay 209 for the ten lines in the second ten-line group. Accordingly, the C conductors of each relay are connected by jumpers to respective tens digit wires, conductor C1 of relay 208 to wire T0 and conductor C2 of relay 209 to wire T1, so that operation of relay 208 marks the ten line group "0" and operation of relay 209 marks the group "1."

Since the lines in the P. B. X group 00 are associated with two different call-in relays, large group relay 201 is called into operation to control relays 208 and 209. To call-in relay 201 for operation, its operate windings are connected to the tens and units wires corresponding to the P. B. X group digits, in a manner similar to the assignment of a group relay.

Accordingly, the tens digit T0 is connected by jumper 252 to the A lead of cable 240, the units digit wire U0 is connected by jumper 253 to the B wire in such cable and the lock lead L is connected to conductor L of cable 240 by the jumper 260.

At the same time for large group operation, the M leads M1 to M5 must be connected to respective P. B. X group relays 208 to 212 to call-in the associated lines for test. Accordingly, the M1 lead is connected by jumper 250 to the L1, A1, and B1 leads of P. B. X group relay 208, while the M2 lead is connected by jumper 251 to the L2, A2, and B2 conductors of the P. B. X group relay 209. In this manner, ground appearing on the M1 lead energizes both the windings of the relay 208 causing it to operate and lock operated, and ground appearing on the M2 lead causes relay 209 to operate and lock in like manner.

The unassigned M leads are connected to the P. B. X BU conductor by jumper 262 to cause a busy indication to be returned to the calling line in the event no idle lines are found in the two call-ins.

Assuming the calling line to have dialed and registered a tens digit 0 and a units digit 0 on the respective tens and units registers TR and UR, the grounds appearing on the tens and units wires T0 and U0 are extended over associated jumpers 252 and 253 to the battery-connected windings of large group relay 201.

Relay 201 operates and locks to the lock lead L; its contacts 8 connect the battery-connected winding of P. B. X relay 325 (controller CC1) in series with the battery-connected winding of the hunt-start relay 206 instead of the regular start relay 205 hereinbefore described, causing P. B. X relay 325 and hunt-start relay 206 to operate; and its contacts 3 to 7 prepare an operate circuit for relays 208 and 209.

Make contacts 2 of hunt-start relay 206 extend ground potential from break contacts 1 of busy relay 207 through break contacts 1 of knockdown relay 204 to the knockdown winding of the motor magnet M of register REG, causing it to release all actuated contact sets; contacts 4 extend battery potential from current-limiting resistor 244 to locking conductor 245 in preparation for locking the test relay operated, in a manner similar to a regular P. B. X call; contacts 5 extend ground potential to the battery-connected winding of knockdown relay 204 causing it to operate after a slight delay period, such delay period providing substantial time for the motor magnet to release the operated contact sets of register REG; make contacts 6 extend ground potential to the battery-connected winding of preference shift relay 202 in preparation for shifting the preference among the P. B. X group relays 208 and 209; and its contacts 7 and 8 connect the tens operate wire P. B. X T–OP to the chain contacts 2 of relays 214 to 223 in preparation for grounding the C conductor associated with the operated P. B. X group relay.

Relay 202 operates from ground at contacts 3 of busy relay 207 and at its make contacts 1 short-circuits relay 203. Responsive to the consequent removal of ground from wire 267 and the winding of relay 202, relay 203 operates in series with relay 202 and locks operated. When ground reappears on wire 267, relay 202 restores but relay 203 is held operated through its lower winding. If ground then disappears from wire 267, relay 203 restores and the shift relays are returned to their normal illustrated position, unoperated.

Make contacts 1 of knockdown relay 204 transfer ground potential from the release winding of the register magnet to wire W1 through break contacts 2 of relay 206 and make contacts 1 of the register. At the same time, break contacts 2 of relay 204 remove ground from wire 267 permitting relay 203 to lock operated in series with relay 202 through their upper windings, to ground at make contacts 1 of relay 202. The ground appearing on wire W1 is therefore extended through make contacts 3 of relay 203 and through make contacts 3 of large-group relay 201 to the M1 wire extending to terminal board TB over the associated conductor in cable 241. The ground appearing on the M1 wire is extended over jumper 250 to the battery-connected windings of P. B. X group relay 208.

P. B. X group relay 208 operates and locks through its contacts 11 and 12 to the grounded M1 wire; its make contacts 1 to 10 extend to sleeve conductors of the noted ten lines associated with relay 208 to the contacts of relay 213; its make contacts 14 extend the ground from the tens operate wire P. B. X T–OP through make contacts 8 of relay 206 to wire 242 from whence it is extended through make contacts 14 of the operated P. B. X group relay, through make contacts 7 of relay 206 and through break contacts 2 of each of the test relays 214 to 223 to the battery-connected winding of call-in relay 213.

Call-in relay 213 operates and its make contacts 1 to 10 further extend the sleeve conductors of the ten lines called-in by P. B. X group relay 208 through their associated rectifiers 225 to 234 to the ground-connected winding of the ten test relays 214 to 223.

In the event an idle line is found in the first group of ten lines called in, the concerned test relay operates and locks operated through its make contacts 1 to the battery-potential appearing on conductor 245; its make contacts 2 ground the tens wire corresponding to the tens group containing the called line, in this case, tens wire T0, such circuit including make contacts 13 of group relay 208 and jumper 258; and its make contacts 3 ground the concerned one of the units wires U0 to U9, such wire corresponding to the physical location of the selected idle line.

The grounding of the tens and units wires corresponding to the selected line causes the principal and auxiliary select magnets of the associated switch to operate, thereafter resulting in the extension of the connection to the selected idle line. Controller CC1 thereafter clears out returning group controller GC to normal condition, in a manner similar to that previously described.

Assuming there are no idle lines in the first group of ten lines called-in, none of the test relays 214 to 223 operate and call-in relay 213 remains operated. The ground on the P. B. X units operate wire P. B. X U–OP is thereby maintained on the battery-connected winding of busy relay 207 for a period of time exceeding its slow-operate time. Busy relay 207 consequently operates and its contacts 1 transfer ground potential from the M1 wire to the operate winding of the motor magnet of the register REG through make contacts 1 of the hunt-start relay 206.

Register REG responds to the ground appearing on its operate winding and actuates its contact sets one step in preparation for grounding wire W2 responsive to the restoration of the busy relay 207. Responsive to the removal of ground from the M1 wire, P. B. X group relay 208 restores as ground is removed from its lock lead L1 and from the A1 and B1 leads.

Responsive to the restoration of relay 208, make contacts 14 open-circuit the call-in relay 213 which restores. Contacts 11 of relay 213 in turn open-circuit busy relay 207, which restores. Contacts 1 of now restored busy relay 207 now extends ground to the W2 wire through break contacts 2 and make contacts 1 of register REG.

The ground appearing on the M2 wire is extended through make contacts 2 of relay 203 and make contacts 4 of relay 201 to the battery-connected windings of P. B. X group relay 209 over jumper 251. Relay 209 operates and locks operated to the ground on the conductor L2 through jumper 258. At such time, make contacts 1 to 10 of group relay 209 calls-in for test the sleeves of the ten lines in the second group of lines in the P. B. X group 00. Again, the operation of the call-in relays, the test relays, and the busy relay is as hereinbefore described.

In the event there are no idle lines in either of the two groups called in, busy relay 207 operates in a manner hereinbefore described and causes the register to advance one more step to extend ground potential to the P. B. X busy wire BU, as the M3, M4, and M5 wires are connected to the P. B. X busy wire over jumper 262, when only two subgroups are provided. As is apparent, in the event that there are more than two P. B. X subgroups of lines in a called P. B. X group, additional P. B. X group relays such as 208 to 212 may be assigned to the remainder of the M wires as needed, with the unused wires being connected to the busy conductor P. B. X BU.

Responsive to the determination of an idle line in the second group of lines called in, the corresponding ones of the tens and units wires are grounded in the manner hereinbefore described causing the principal and auxiliary select magnets of the associated switch to operate to extend the connection to an idle line in the called P. B. X group, the controllers thereafter clearing out.

On the next call-in of the large-group relay on another call, ground is extended over conductor 267 and through make contacts 1 of the now-operated preference shift relay 203 to the differentially-connected winding of relay 202, causing it to restore. Responsive to the operation of the knockdown relay a short time thereafter, as hereinbefore noted, ground is removed from wire 267 restoring preference shift relay 203. At such time, both relays 202 and 203 are restored and the wires W1 to W4 are connected to the M wires as illustrated, rather than shifted as previously noted. In this manner, the pairs of P. B. X call-in relays associated with wires W1 and W2, and W3 and W4, are energized in succession on successive call-ins, so that on alternate call-ins of large P. B. X groups the P. B. X group relay operating sequence is shifted.

The register REG is left in its operated position on the completion of each call, and on the start of the next succeeding large-group call-in, is restored as described to call-in the P. B. X group relay assigned the associated M wire.

In the event, the lines in a P. B. X group are lines of several different ten-line groups, such lines can be included in one P. B. X group, provided a separate P. B. X group relay is used for each separate ten-line group.

Assuming a P. B. X group has four lines in the first ten-line group, four lines in a second ten-line group, and four lines in a third ten-line group, three P. B. X group relays are assigned, a separate relay for each of the groups of four lines. The C conductors of each relay is then connected to the tens wire corresponding to the ten-line group of the associated line.

When the relays are operated on call-ins, the contacts 13 thereon select the proper ten-line group and control the select magnets accordingly. While such an arrangement is pointed out for a 12-line P. B. X group, it is apparent such arrangement is adaptable for P. B. X groups having less than ten lines or having more than twelve.

While we have described the principles of our invention in connection with a specific telephone system, it is to be understood that this description is made only by way of example not not as a limitation to the scope of our invention.

We claim:

1. In a switching system, a switchboard including switching apparatus terminating lines in a given fixed correspondence to respective line numbers each of which includes a tens digit and a units digit, registering means in the switchboard for registering the tens and units digits of the line number of any called one of the lines, indicating means controlled thereby for indicating the tens location and units location of the called line, switch-operating means normally responsive jointly to the tens and units location indications for operating the switching apparatus to make connection to the called line, a detecting means and means for assigning it to any desired line-number setting of the registering means, means responsive to the registering means being set in accordance with the said any desired line number for operating the detecting means to cancel the said units-location indication, whereby the operation of the switching apparatus is held in abeyance, test means controlled by the detecting means for testing selected ones of a group of lines having a common tens digit in their line numbers, selecting means including the test means for selecting an idle one of the tested lines, and means controlled by the selecting means for substituting an indication of the units location of the selected idle line for the cancelled units location indication, the said switch-operating means thereupon operating the switching apparatus to make connection with the last-said selected idle line.

2. In a switching system according to claim 1, means controlled by the operation of the said detecting means for also cancelling the said tens location indication and for substituting a tens location indication corresponding to the said common tens digit for the cancelled tens location indication.

3. In a switching system according to claim 2, the said means for substituting a tens location indication being responsive to the selection of an idle line.

4. In a switching system according to claim 2, a second group of lines having a different common tens digit, means responsive to all of the said tested lines being found busy for controlling the testing means to test the lines in the second group of lines, and means responsive to the selection of an idle one of the lines in the second group of lines for controlling the said tens location substituting means to substitute a tens location indication corresponding to the said different common tens digit for the cancelled tens location indication.

5. In a switching system according to claim 4, preference shifting means and means for operating it on successive calls to alternate the testing order of the said groups of lines.

6. In a switching system, a controller for controlling switches to extend connections to respective idle lines of called groups of lines, call-in relays in the controller and means for assigning them to call in for test selected ones of the lines of respective called groups of lines, test means associated with the call-in relays for testing the lines in any called-in group of lines to select an idle one for connection by the said switches, a group relay for controlling selected ones of the call-in relays, means responsive to the calling of selected groups of lines for directly operating the associated call-in relay, means responsive to the calling of the groups of lines associated with the call-in relays controlled by the group relay for operating the group relay, and means controlled thereby for operating the associated call-in relays, whereby the lines of several of said groups of lines are called-in for test.

7. In a switching system according to claim 6, wherein the test means is common to all of said call-in relays, the said means controlled by the group relay for operating the associated call-in relays includes means for operating such relays on a one-at-a-time basis, whereby the test means is associated with only one group of lines at any time.

References Cited in the file of this patent

UNITED STATES PATENTS

| | | |
|---|---|---|
| 2,232,371 | Dehn | Feb. 18, 1941 |
| 2,412,258 | Gillings | Dec. 10, 1946 |
| 2,490,036 | Deakin | Dec. 6, 1949 |
| 2,692,917 | Mange | Oct. 26, 1954 |